Aug. 15, 1939.   R. E. JENSEN   2,169,532
POSITION LOCATING APPARATUS
Filed Aug. 20, 1937   4 Sheets-Sheet 2
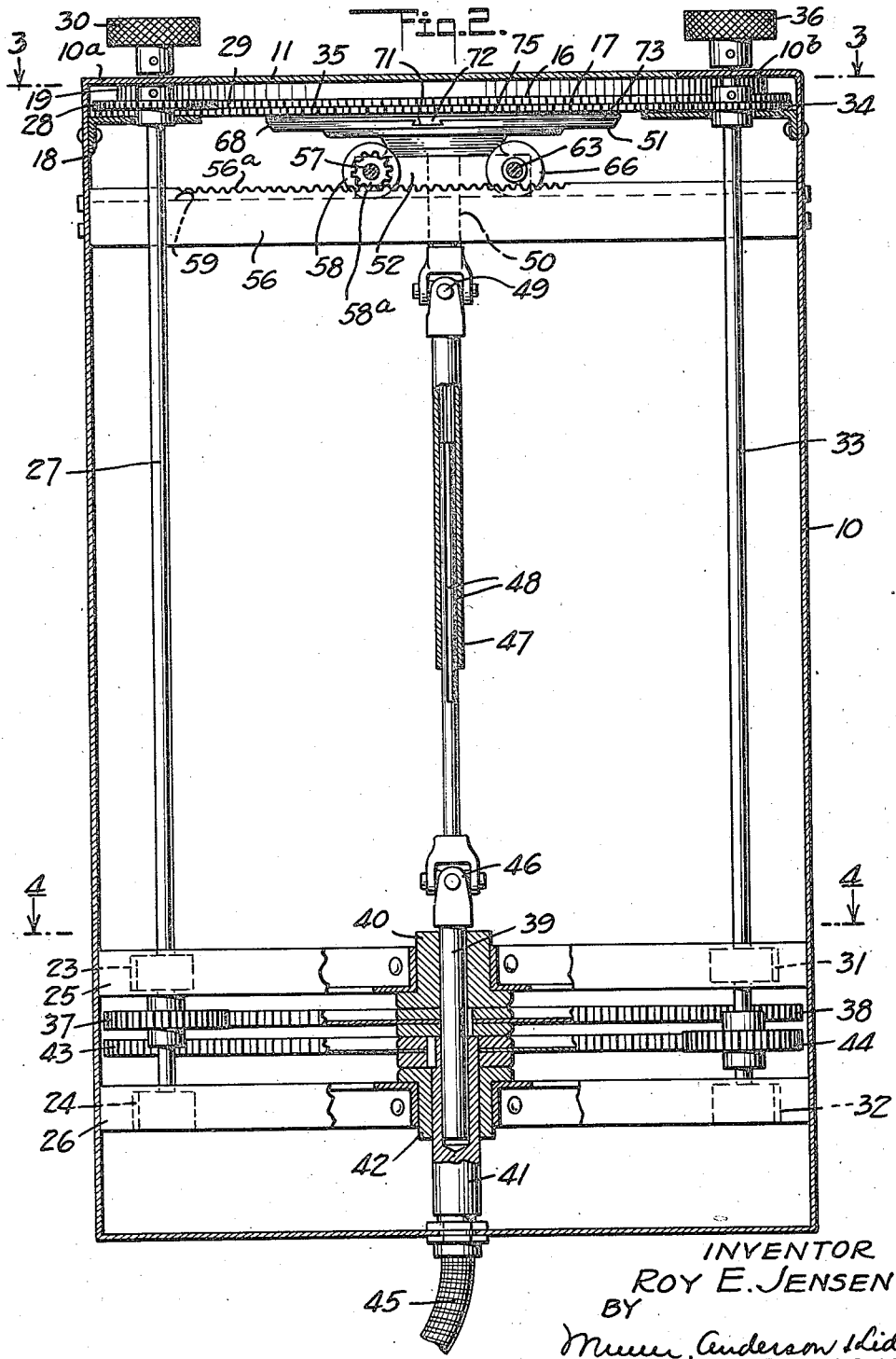
INVENTOR
ROY E. JENSEN
BY
Munn, Anderson & Liddy
ATTORNEYS Aug. 15, 1939. R. E. JENSEN 2,169,532
POSITION LOCATING APPARATUS
Filed Aug. 20, 1937 4 Sheets-Sheet 3
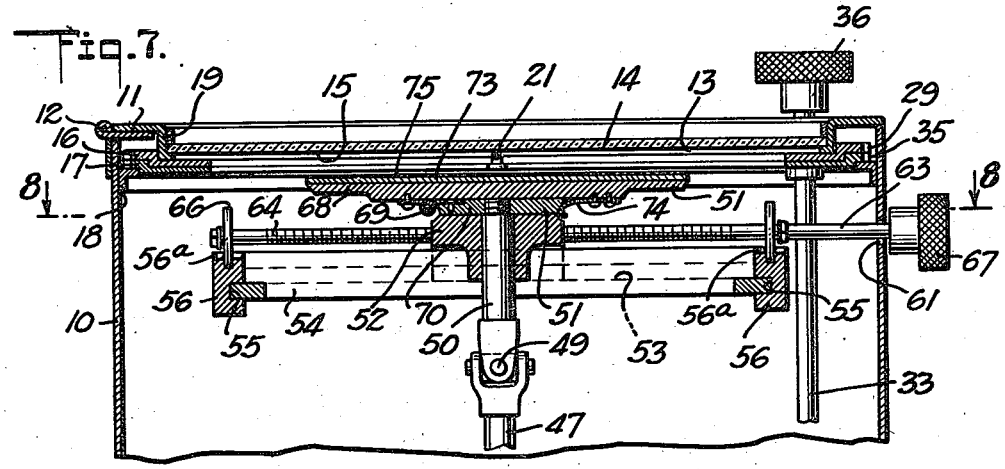
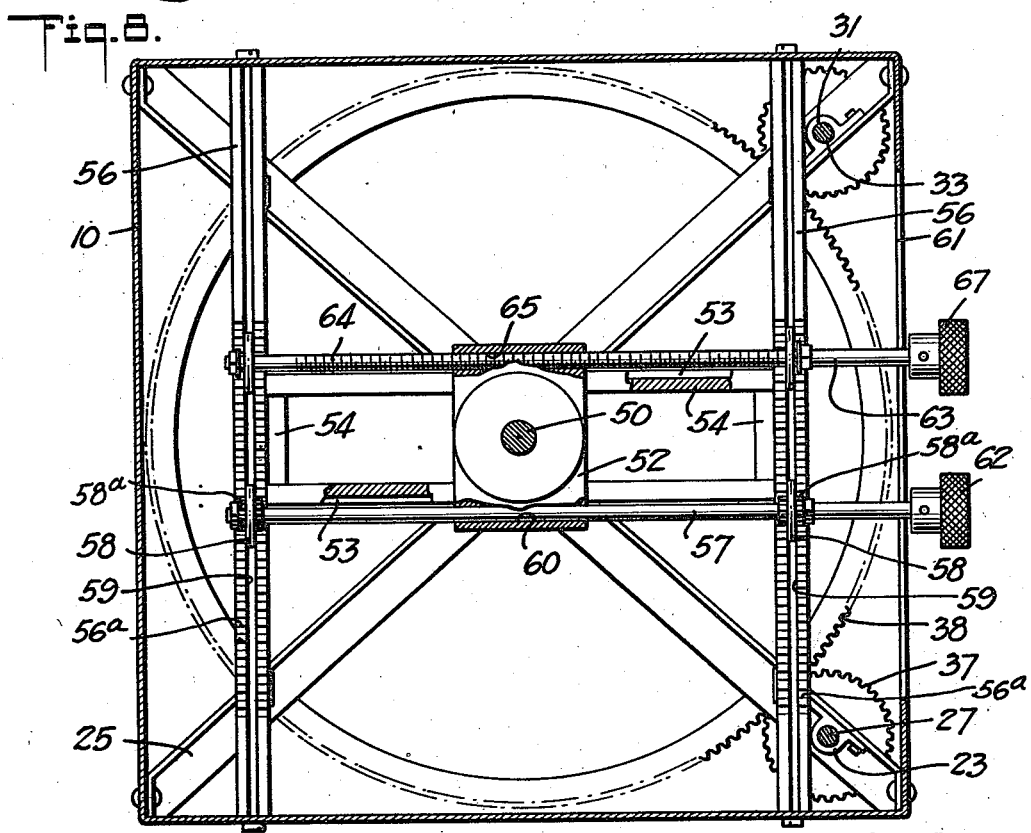
INVENTOR
ROY E. JENSEN
BY
Menem, Anderson & Liddy
ATTORNEYS Aug. 15, 1939. R. E. JENSEN 2,169,532
POSITION LOCATING APPARATUS
Filed Aug. 20, 1937  4 Sheets—Sheet 4
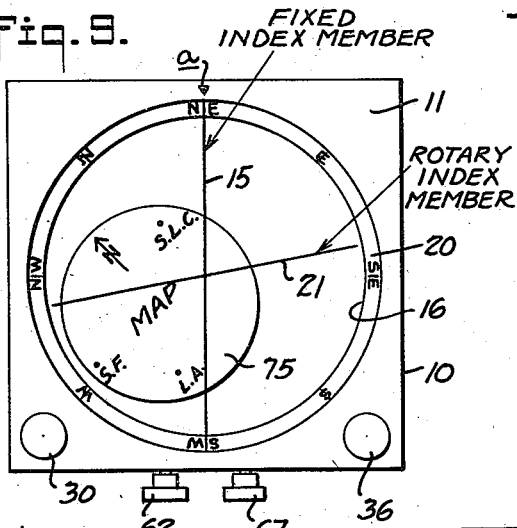
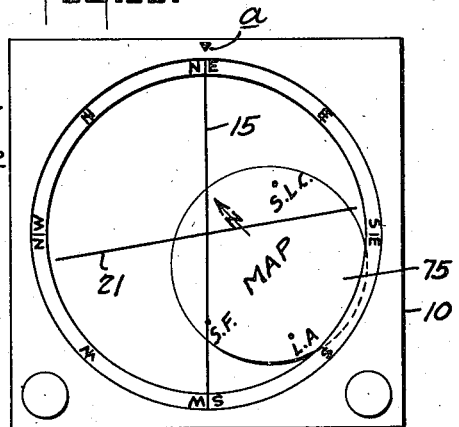
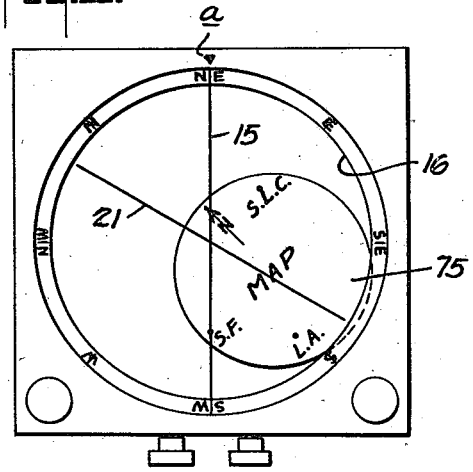
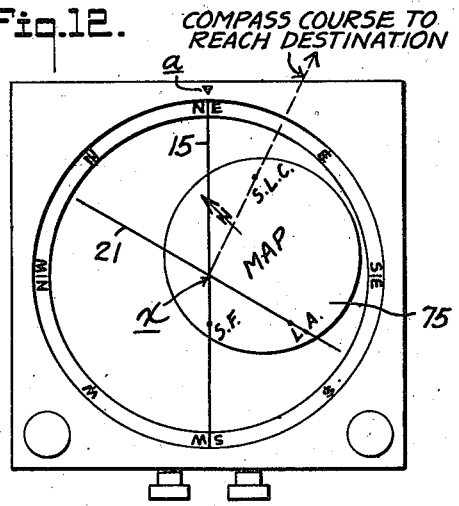
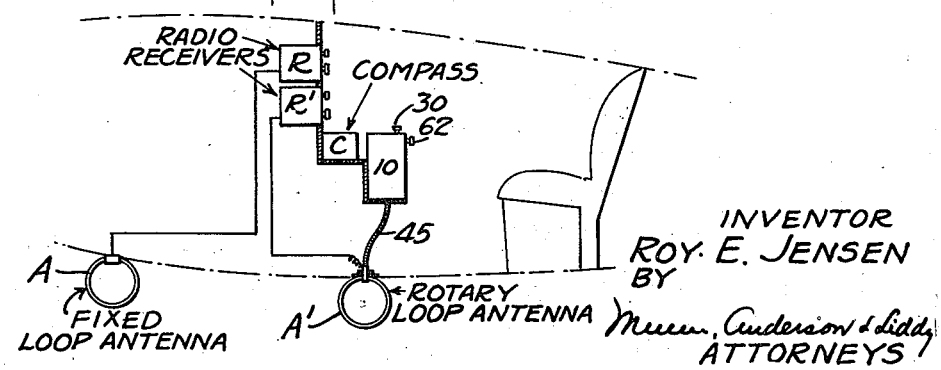

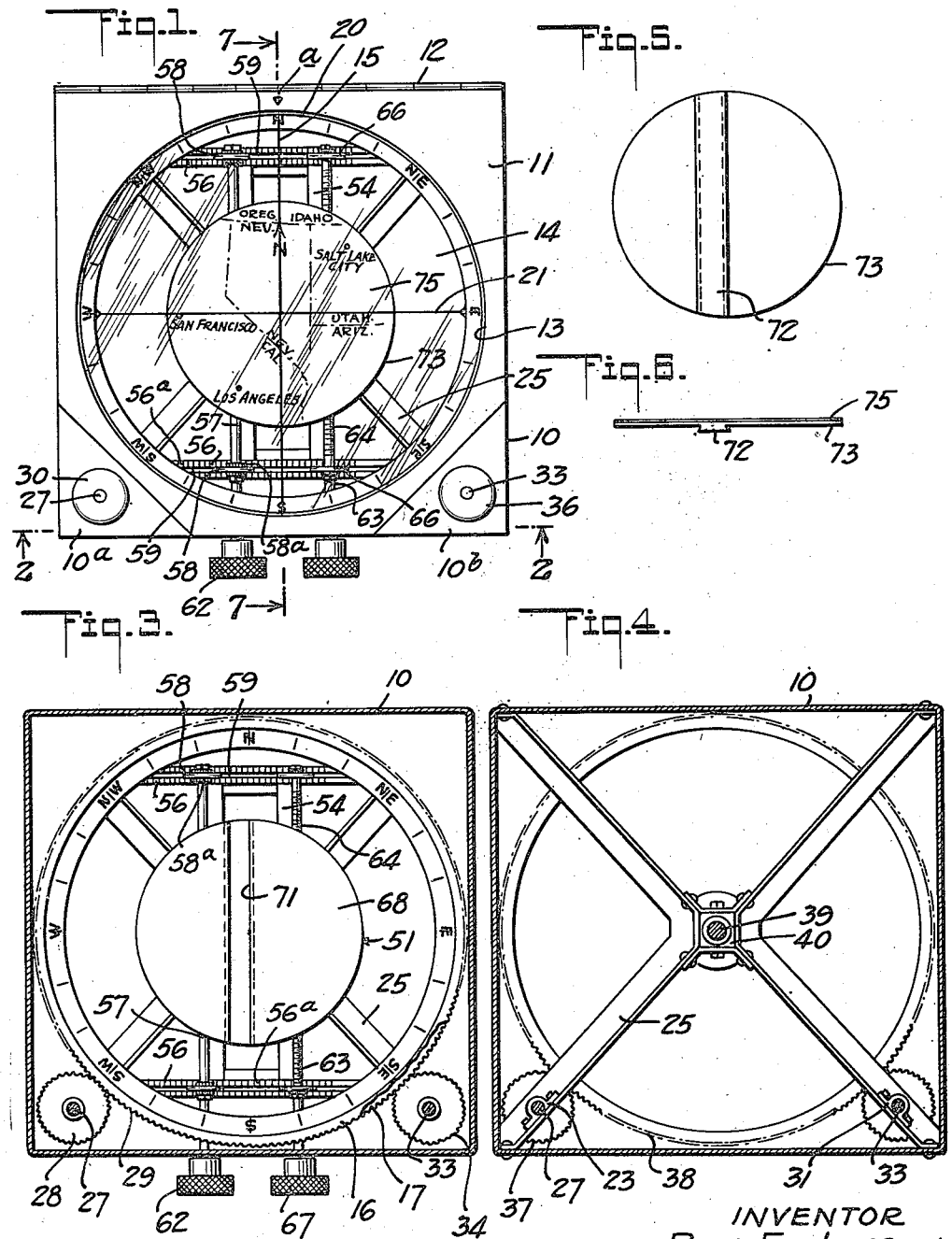

Patented Aug. 15, 1939

2,169,532

UNITED STATES PATENT OFFICE 2,169,532

POSITION-LOCATING APPARATUS

Roy E. Jensen, Topanga Canyon, Calif., assignor of one-fourth to Carl Edwards, West Hollywood, Calif., and one-fourth to Manuel L. Murrell, Santa Monica, Calif.

Application August 20, 1937, Serial No. 160,081

14 Claims. (Cl. 250—11)

This invention relates generally to the art of navigation, and more particularly to devices for locating the geographical position of a body on the earth.

An object of the invention is to provide an apparatus which, in its association with a movable body, such as an aircraft or other medium of transportation, is operable to geographically locate the position of the body so as to enable the proper course to be followed in order to travel to a particular destination.

A further object of the invention is to provide an instrument of the above described character which utilizes radio receivers, respectively having fixed and rotary directional antennae, to determine the direction of known broadcasting stations from the site of the instrument, all in such manner that in conjunction with a compass, the information thus obtained can be directly interpreted on a correlated chart or map in terms of the geographical position of the instrument, so that the proper compass course can be followed to arrive at any destination.

Another object of the invention is to provide an instrument embodying index members, respectively fixed and rotatable relative to the craft in a manner to be intersectable for co-action in indicating on an adjustable chart or map, the geographical position of the craft, all by utilizing a compass in conjunction with directionally received signals from broadcasting stations at known locations, to enable the movable index member and the map to be so adjusted that the geographical position of the craft can be read directly on the map at the intersection of the members.

With these and other objects in view, the invention consists in the combinations and arrangement of elements as set forth in the following specification and more particularly pointed out in the appended claims.

In the accompanying drawings,

Figure 1 is a plan view of the position locating instrument;

Figure 2 is an enlarged vertical sectional view taken on the line 2—2 of Figure 1;

Figures 3 and 4 are horizontal sectional views taken, respectively, on the lines 3—3 and 4—4 of Figure 2;

Figure 5 is a bottom plan view of a map plate embodied in the instrument;

Figure 6 is a view of the map plate in side elevation;

Figure 7 is an enlarged fragmentary vertical sectional view taken on the line 7—7 of Figure 1;

Figure 8 is a horizontal sectional view taken on the line 8—8 of Figure 7;

Figures 9, 10, 11 and 12 are diagrammatic views illustrating various portions of the instrument during an operation to locate the position of a body on the map;

Figure 13 is a diagrammatic view showing the installation of the apparatus in an aircraft.

Referring specifically to the drawings, the invention in its present embodiment comprises a rectangular casing 10, which, in the use of the instrument on an aircraft or other vehicle, is secured in a fixed position at a location convenient for the manipulation of its mechanism by the pilot or navigator, as the case may be. As diagrammatically shown in Figure 13, the aircraft is assumed to be equipped with the usual compass C and with two separate radio receivers R and R' of conventional construction, the receiver R being provided with a fixed loop antenna A which is, therefore, directional, and the receiver R' being provided with a similar and rotatably mounted loop antenna A' operatively connected to the instrument for rotation in response to manipulation of certain mechanism of the instrument in a manner to be later described. The disposition of the fixed antenna A is such that when a broadcasted signal is received at maximum volume by the respective receiver R, the craft will be headed in the direction of the source of the signal.

The top of the casing is closed by a cover 11 hinged at 12 along one edge of the casing. The cover is provided with a large circular opening 13 spanned by a transparent glass panel 14, the underside of which is suitably scored or otherwise marked to provide a fixed index member 15 in the form of a straight hair line which is parallel with the longitudinal axis of the craft and is diametrically related to the opening.

Co-axially related to each other and to the opening 13 immediately beneath the panel 14 are interfitting rings 16 and 17 freely rotatable relatively, and rotatably mounted in the casing 10 between a supporting flange 18 on the latter, and the annular wall 19 of the cover 11 as clearly shown in Figure 7. The upper surface of the ring 16 which is observable through the opening 13 constitutes a dial 20 suitably graduated and marked to designate the points of the compass as shown in Figure 1, for co-action with the fixed index member 15 in indicating various compass courses upon rotation of the ring 16.

The other ring 17 provides a rotatable mounting for a second index member 21 in the form of a fine gage wire which is stretched taut to extend diametrically of the opening 13 and thus be capable, upon rotating the ring 17, of occupying various intersecting relationships to the fixed index member 15, and of co-acting with the compass dial 20 to indicate various compass courses.

Journaled at one corner of the casing 10 in a top wall section 10a thereof, and in spaced bearings 23 and 24 carried by supporting frames 25 and 26 adjacent the bottom of the casing, is an operating shaft 27 having a pinion gear 28 constantly meshing with gear teeth 29 on the periphery of the compass ring 16. An operating knob 30 is fixed to the exposed upper end of the shaft 27 to enable the latter to be conveniently rotated, and thus rotate the compass ring.

Journaled at an opposite corner of the casing 10 in a top wall section 10b thereof, and in spaced bearings 31 and 32 carried by the supporting frames 25 and 26, respectively, is a second operating shaft 33. A pinion gear 34, fixed to the shaft 33, constantly meshes with gear teeth 35 on the index carrying ring 17, for rotation of the latter through the pinion gear, by an operating knob 36 fixed to the exposed upper end of the shaft 33.

Fixed to the operating shaft 27 between the bearings 23 and 24 is a pinion gear 37 having the same number of teeth as the pinion gear 28 and constantly meshing with a gear 38 fixed to a stub shaft 39 journaled at one end in a bearing 40 supported by the frame 25 (Figure 2). The other end of the shaft 39 is rotatably mounted in a hollow stub shaft 41 journaled in a bearing 42 supported by the frame 26, and having fixed thereto a gear 43 with which constantly meshes a pinion gear 44 having the same number of teeth as the pinion gear 34, and fixed to the operating shaft 33.

The shaft 41 projects from the bottom of the casing and is operatively connected by means of a flexible shaft 45 to the rotary loop antenna A' of the receiver R'. It will thus be clear that rotation of the shaft 33 will rotate the index ring 17 and the antenna A' in unison, and it is to be understood that the rotary index member 21 and the antenna A' are circumferentially related, so as to be disposed in parallel planes. Thus the index member 21 and the antenna A' are each correlated with the same point of the compass in any position of rotational adjustment.

The upper end of the stub shaft 39 is connected by a universal joint 46 to one end of a drive shaft 47 composed of telescopically associated sections, having a splined connection 48 therebetween. A second universal joint 49 connects the other end of the shaft 47 to the depending stub shaft 50 of a map table 51. The shaft 50 rotatably mounts the map table on a carriage 52 slidably mounted for reciprocating movement in guideways 53 in a second carriage 54 (Figures 7 and 8) slidably mounted for reciprocating movement in guideways 55 of tracks 56 fixed to opposite side walls of the casing 10 in position for the carriages 52 and 54 to co-act in mounting the map table for movement in all directions parallel to a plane transversely related to the axis of the map table. By virtue of the splined connection provided by the drive shaft 47, this lateral or transverse movement of the map table can be effected while maintaining the rotational relationship and driving connection between the map table and the compass ring 16 so that the two will at all times be operatively connected for rotation in unison irrespective of the lateral position of the map table in the opening 13.

An actuating shaft 57 for the carriage 53 has fixed thereto wheels 58—58 riding freely in grooves 59 of the tracks 56, and passes freely through a bore 60 (Figure 8) in the carriage 52, and through a slot 61 in the casing 10. Pinion gears 58a—58a are also fixed to the shaft 57 at opposite sides of the wheels 58, and mesh with rack teeth 56a on the tracks 56. The exposed end of the shaft 57 is provided with an operating knob 62, and it will be clear that by rotating this knob, the wheels 58 will roll in the grooves 59, and the gears 58a will co-act with the teeth 56a to positively feed the carriages 52 and 54 as a unit toward one side or the opposite side of the casing.

An actuating shaft 63 for the carriage 52 is externally threaded at 64, and is threaded through a bore 65 in the carriage. The shaft 63 is provided with wheels 66 also riding in the grooves 59 to guide the shaft, and projects through the slot 61. The exposed outer end of the shaft 63 is provided with an operating knob 67, which, upon being rotated, causes the shaft to co-act with the carriage 52 in feeding the latter relatively to the carriage 54 at a right angle to the direction of unitary movement of the carriages obtained by rotating the knob 62.

Thus it will be apparent that by manipulating the knobs 62 and 67 the map table 51 can be moved parallel to the plane of the compass and index rings 16 and 17 to any position within the area of the opening defined by the dial 20 of the compass ring, and will be observable through the panel 14.

The upper section 68 of the map table, which is in the form of a disk, is hinged at 69 to the lower section 70, and is provided in its upper surface with a non-diametric dovetailed groove 71 (Figures 2 and 7) adapted to snugly receive a similarly non-diametric dovetailed tongue 72 on a map plate 73 in the form of a disk the diameter of which corresponds to that of the section 68. Thus the map plate can only be applied to the map table in one position circumferentially thereof with the table and plate co-axially related, in which relationship the map plate will be disposed with its upper map bearing surface in close proximity to the rotary index member 21.

By the provision of the hinge 69, the section 68 of the map table can be tilted upwardly when the cover 11 is raised, so as to permit different map plates to be applied to and removed from the map table. A latch 74 enables the section 68 to be releasably retained in its lowered or working position.

It is to be understood that the map table has permanently fixed thereon an accurately scaled map 75 of a particular territory in which the craft carrying the instrument is to operate, and it will be noted that the positioning of the map on the map plate is such that the compass directions of the map correspond to those of the compass ring 16. As the compass ring and map plate are operatively connected through the gears 28, 37, 38 and shaft 47, to rotate in unison, their rotational relationship will remain constant in all positions of adjustment.

The operation of the invention is as follows: Let it be assumed that an aircraft in flight is equipped with the instrument and with the receivers R and R', respectively, provided with the antennae A and A', and that the geographical position of the craft in the area covered by the map 75 on the map table 51 is unknown. A broadcasting station, the location of which is known by its call letters, is tuned in on the receiver R, and it will be clear that due to the directional characteristics of its fixed antenna A, that when the broadcasted signal is received at maximum volume, as is accomplished by changing the course of the craft, the longitudinal axis of the craft will be alined with the source of the signal. Now, as the fixed antenna A is in parallelism with the longitudinal axis of the craft, it will be manifest that the compass course of the ship with respect to such station can be readily ascertained by consulting the ship's compass C.

For example, let it be assumed that the destination of the aircraft from Los Angeles is Salt Lake City, and that the station tuned in on the receiver R is located in San Francisco. Furthermore, let it be assumed that the reading of the compass C is due NE. The knob 30 controlling the compass ring 17 and map table 51 for rotation in unison, is now manipulated until the NE graduation on the dial 20 is alined with the fixed index 15 at the head a thereof on the cover 11 of the casing 10. In connection with this adjustment, which is shown in Figure 9, it will be remembered that the rotational position of the map 75 corresponds in compass directions to that of the dial 20 as also shown in this figure.

The knob 62, which controls unitary movement of the carriages 62 and 64, is now manipulated until the map table 51 has been shifted laterally or transversely towards the starboard side of the craft to bring the location of San Francisco on the map 75, directly under the fixed index line 15 at some point along its length as shown in Figure 10.

Following this adjustment, and with the NE compass course maintained, the knob 36 is manipulated to rotate the ring 17 carrying the rotary index wire 21, and the loop antenna A' of the receiver R' in unison, until a second broadcasting station, (at Los Angeles, for example), whose location is also known by its call letters, and is preferably at as large an angle from the first broadcasting station as possible, is tuned in on the receiver R'. When the broadcasted signal from this station is received at maximum volume as a result of the directional characteristic of the antenna A', it will be clear that the angular relationship between the fixed and movable index members, as shown in Figure 11, will indicate the direction of the second station from the compass course of the craft, as can be ascertained by reading the dial 20.

The knob 67, which controls the movement of the carriage 62 longitudinally relative to the carriage 64, is now manipulated until the map table 51 has been shifted in a fore and aft direction to bring the location of Los Angeles on the map 75, directly under the movable index member 21 at some point along its length as shown in Figure 12. It will be manifest that the location of the craft can be read directly on the map at the intersection of the fixed and movable lines, as indicated at X in this figure, so that the proper compass course necessary to reach the Salt Lake City destination of the craft can be readily determined. By the scale of the map the actual distance of the craft from its destination can be easily calculated.

What is claimed is:

1. The combination, with a compass and a plurality of radio receivers, respectively provided with fixed and rotary antennae having directional characteristics; of a map of the territory in which the location of said receivers is unknown; means mounting said map for rotation to change its relationship to the points of the compass, and for movements transversely relative to its axis of rotation, in two directions at a right angle to each other; means defining intersectable lines of direction, one of which is in fixed relationship to the fixed antenna, and the other of which is rotary; means for rotating the map to establish the fixed line of direction thereon in correspondence with the compass direction from which the signal of a known broadcasting station is received at maximum volume by the receiver having the fixed antenna; means by which the map can be adjusted transversely in one of its two directions for the fixed line of direction to pass through the location of said broadcasting station on the map; means adapted to co-act with the receiver having the rotary antenna, and by which the rotary line of direction can be rotated to correspond in compass direction to that of a signal from a second known broadcasting station when received at maximum volume on the rotary antenna; and means by which the map can be adjusted transversely in the other of its two directions, for the rotary line of direction to pass through the location of the second said broadcasting station on the map.

2. The combination, with a compass and a plurality of radio receivers, respectively provided with fixed and rotary antennae having directional characteristics, of a map of the territory in which the location of said receivers is unknown; means mounting said map for rotation to change its relationship to the points of the compass, and for movements transversely relative to its axis of rotation, in two directions at a right angle to each other; rotatably adjustable means designating the points of the compass; means operatively connecting said rotatably adjustable means and map for rotation in unison with their compass directional relationships corresponding; means defining intersectable lines of direction, one of which is in fixed relationship to the fixed antenna, and the other of which is rotary; means for rotating the map to establish the fixed line of direction relative to said rotatably adjustable means, in correspondence with the compass direction thereon from which the signal of a known broadcasting station is received at maximum volume by the receiver having the fixed antenna; means by which the map can be adjusted transversely in one of its two directions, for the fixed line of direction to pass through the location of said broadcasting station on the map; means adapted to co-act with the receiver having the rotary antenna, and by which the rotary line of direction can be rotated to correspond in compass direction to that of a signal from a second known broadcasting station when received at maximum volume on the rotary antenna; and means by which the map can be adjusted transversely in the other of its two directions, for the rotary line of direction to pass through the location of the second said broadcasting station on the map.

3. In position locating apparatus, a map; means mounting the map for rotation to vary its relationship to points of the compass, and for movements transversely relative to its axis of rotation in two directions at a right angle to each other; relatively fixed and rotary index members; means by which said map can be rotated to obtain various compass relationships of the map to the fixed index member; means by which the map can be adjusted transversely in the direction to correlate a certain locality on the map with the fixed index member; means by which the rotary index member can be rotated to occupy various compass relationships to the map and fixed index member; and means by which the map can be adjusted transversely in the other direction to correlate another certain locality on the map with the rotary index member for a reading at the intersection of said members as described.

4. In position locating apparatus, a map; a carriage on which said map is rotatably mounted; a second carriage on which the first carriage is rectilinearly adjustable in a direction transverse to the map axis; means mounting the second carriage for movement in a direction transverse of the map axis and at a right angle to the aforestated direction; fixed and rotatable index members adapted to occupy various intersecting relationships with respect to said map; means for rotating the rotary index member; feeding means for each carriage; and means for rotating the map in any position of the carriages.

5. In position locating apparatus, a map; means mounting said map for rotation and for movements transversely relative to its axis of rotation, in two directions at an angle to each other; fixed and rotary index members adapted to co-act in defining intersectable lines of direction at various locations on said map; means for rotating the rotary index member; means by which the map can be adjusted in each of said transverse directions relative to the map axis; and means for rotating the map in any transverse position of adjustment thereof.

6. In position locating apparatus, a map of a preselected territory, having means designating the points of the compass, correlated with the territory displayed by the map; means mounting the map for rotation and for movements transverse of the map axis in two directions at an angle to each other; an index member adapted to define a line of direction fixed relative to the map; a second index member adapted to define a line of direction and rotatably mounted to occupy various positions of intersecting relationship to the first index member at various locations on said map; means for rotating the rotary index member; means for adjusting the map in the aforestated transverse directions; and means for rotating the map irrespective of the transverse position of adjustment of the map.

7. In position locating apparatus, a map; means mounting said map for rotation and for movements transversely relative to its axis of rotation, in two directions at an angle to each other; fixed and rotary index members adapted to co-act in defining intersectable lines of direction at various locations on said map; means for rotating the rotary index member; means by which the map can be adjusted in each of said transverse directions relative to the map axis; means for rotating the map in any transverse position of adjustment thereof; and means by which the rotary index member is adapted to be operatively connected to a rotary antenna of a radio receiver to rotate such index member and antenna in unison.

8. In position locating apparatus, a support having an opening and a fixed index member spanning the opening; a member rotatably mounted in said opening and having means adapted to co-act with said fixed index member in indicating various compass courses; a map of a preselected territory; means mounting said map in said opening for rotation and for movements transverse of the map axis in two directions at an angle to each other; a second index member rotatably mounted in said opening to occupy various intersecting relationships to the fixed index member for co-action of the index members with said map; means for adjusting the map transverse of the map axis as aforestated, so as to enable predetermined locations thereon to be correlated with said index members; and means for rotating the map and compass course indicating member in unison to correlate them with the fixed index member.

9. In position locating apparatus, a support having an opening and a fixed index member spanning the opening; a member rotatably mounted in said opening and having means adapted to co-act with said fixed index member in indicating various compass courses; a map of a preselected territory; a carriage on which said map is rotatably mounted in said opening; a second carriage on which the first carriage is movable in a direction transverse of the map axis; means mounting the second carriage for movement in a direction transverse of the map axis and at a right angle to the aforestated transverse direction; a second index member rotatably mounted in said opening to occupy various intersecting relationships to the fixed index member for co-action of the index members with said map; means for feeding the carriages to enable predetermined locations on the map to be correlated with the index members; and means for rotating the map and compass course indicating member in unison to correlate them with the fixed index member.

10. In position locating apparatus, a support having an opening and a fixed index member spanning the opening; a member rotatably mounted in said opening and having means adapted to co-act with said fixed index member in indicating various compass courses; a map of a preselected territory; a carriage on which said map is rotatably mounted in said opening; a second carriage on which the first carriage is movable in a direction transverse of the map axis; means mounting the second carriage for movement in a direction transverse of the map axis and at a right angle to the aforestated transverse direction; a second index member rotatably mounted in said opening to occupy various intersecting relationships to the fixed index member for co-action of the index member with said map; means for moving the second carriage on its mounting to adjust the carriages and map transversely of the map axis in one of said directions; means for moving the first carriage on the second carriage, to adjust the map transversely of its axis in the other of said directions; and means operatively connecting the compass course indicating member and map for rotation in unison irrespective of the transverse position of adjustment of the map.

11. In position locating apparatus, a support having an opening and a fixed index member spanning the opening; a compass course indicating dial rotatably mounted in said opening, with said fixed index member in diametric relation thereto; a map of a preselected territory; a carriage on which said map is rotatably mounted in said opening; a second carriage on which the first carriage is movable in a direction transverse of the map axis; means mounting the second carriage for movement in a direction transverse of the map axis and at a right angle to the aforestated transverse direction; a second index member rotatably mounted in said opening in diametric relationship to said dial for co-action with the fixed index member and the map; means for feeding the carriages to enable predetermined locations on the map to be correlated with the index members; and means for rotating the map and compass course indicating member in unison to correlate them with the fixed index member.

12. In position locating apparatus, a casing having an opening; a fixed index member spanning the opening; a pair of co-axially related gear rings rotatably mounted in the casing, one of which is provided with a compass course indicating dial exposed in said opening, and with which the fixed index member is in diametric relationship; a map of a preselected territory; a carriage on which the map is rotatably mounted in said opening; a second carriage on which the first carriage is movable in a direction transverse of the map axis; means mounting the second carriage in the casing for movement in a direction transverse of the map axis and at a right angle to the aforestated transverse direction; a second index member carried by the other gear ring in diametric relationship to said dial for co-action of the index members in intersecting relationships with various localities on the map; a shaft journaled in the casing and having a pair of gears one of which meshes with said dial bearing gear ring; a second shaft journaled in the casing, and having a gear meshing with the other gear ring; means operatively connecting the other gear of the first mentioned shaft to the map for rotation thereof in unison with the dial bearing gear ring irrespective of the position of transverse adjustment of the map; and means for feeding the carriages, to vary the position of the map transversely of its axis, in the aforestated directions.

13. In position locating apparatus, a casing having an opening; a fixed index member spanning the opening; a pair of co-axially related gear rings rotatably mounted in the casing, one of which is provided with a compass course indicating dial exposed in said opening, and with which the fixed index member is in diametric relationship; a map of a preselected territory; a carriage on which the map is rotatably mounted in said opening; a second carriage on which the first carriage is movable in a direction transverse of the map axis; means mounting the second carriage in the casing for movement in a direction transverse of the map axis and at a right angle to the aforestated transverse direction; a second index member carried by the other gear ring in diametric relationship to said dial for co-action of the index members in intersecting relationships with various localities on the map; a shaft journaled in the casing and having a pair of gears one of which meshes with said dial bearing gear ring; a second shaft journaled in the casing, and having a gear meshing with the other gear ring; means operatively connecting the other gear of the first mentioned shaft to the map for rotation thereof in unison with the dial bearing gear ring irrespective of the position of transverse adjustment of the map; and means by which the second mentioned shaft is adapted to be operatively connected to a rotary antenna of a radio receiver for rotation of the antenna in unison with the second mentioned index member.

14. The combination with a compass and radio receiving means including a rotary directional antenna; of a rotatably mounted map of the territory in which the location of said radio receiving means is unknown; means adapted to co-act with the compass to define an index member on the map corresponding in compass direction to that from which the signal of a known broadcasting station is received at maximum volume by said radio receiving means; means by which said map and index member can be relatively rotated for the index member to pass through the location of said broadcasting station on the map; means adapted to co-act with said radio receiving means, to establish a second index member on the map corresponding in compass direction to that from which the signal of a second known broadcasting station is received at maximum volume; and means by which the map and second said index member can be relatively rotated for the second index member to pass through the location of the second said broadcasting station on the map, whereby to indicate the unknown location on the map at the intersection of said index members.

ROY E. JENSEN.